United States Patent [19]

Payne

[11] Patent Number: 4,956,135

[45] Date of Patent: Sep. 11, 1990

[54] MOLDING APPARATUS AND METHOD

[76] Inventor: Le Roy Payne, 3300 Nicholas La., Molt, Mont. 59057

[21] Appl. No.: 202,267

[22] Filed: Jun. 6, 1988

Related U.S. Application Data

[60] Continuation-in-part of Ser. No. 890,742, Jul. 30, 1986, Pat. No. 4,749,533, which is a division of Ser. No. 766,498, Aug. 19, 1985, Pat. No. 4,671,753.

[51] Int. Cl.⁵ .................. B29C 41/04; B29C 41/52; B29C 67/20
[52] U.S. Cl. ......................... 264/40.7; 264/45.7; 264/297.1; 264/311; 425/4 R; 425/145; 425/150; 425/435; 425/817 R
[58] Field of Search .................. 264/40.7, 40.1, 37, 264/45.7, 102, 297.1, 297.8, 310, 311; 425/4 R, 145, 150, 216, 435, 543, 817 R, 812

[56] References Cited

U.S. PATENT DOCUMENTS

| | | | |
|---|---|---|---|
| 3,052,927 | 9/1962 | Hoppe et al. | 264/45.5 X |
| 3,182,104 | 5/1965 | Cwik | 264/45.7 X |
| 3,843,285 | 10/1974 | Nitta et al. | 425/4 R |
| 3,923,937 | 12/1975 | Piccioli et al. | 264/45.7 |
| 3,952,991 | 4/1976 | Schneider | 264/37 X |
| 4,043,721 | 8/1977 | Lemelson | 425/4 R X |
| 4,150,074 | 4/1979 | Tilgner | 264/40.7 |
| 4,308,226 | 12/1981 | Wingard | 264/37 X |
| 4,314,963 | 2/1982 | Boden et al. | 264/37 X |
| 4,564,487 | 1/1986 | Bennett | 264/40.7 |
| 4,571,319 | 2/1986 | Baluch et al. | 264/45.1 X |
| 4,749,533 | 6/1988 | Payne | 264/40.1 X |

FOREIGN PATENT DOCUMENTS

| | | | |
|---|---|---|---|
| 2138917 | 2/1973 | Fed. Rep. of Germany | 264/45.7 |
| 59-26225 | 2/1984 | Japan | 425/435 |
| 2034239 | 6/1980 | United Kingdom | 264/45.7 |

Primary Examiner—Jeffery Thurlow
Assistant Examiner—Leo B. Tentoni
Attorney, Agent, or Firm—Arthur L. Urban

[57] ABSTRACT

Continuous molding apparatus includes a raw material supplying portion, a mixing portion, a molding portion, a mixture delivery portion, a supporting portion and a control portion. Each reservoir of the raw material supplying portion is independently connected to an inlet of the mixing portion. The molding portion includes a plurality of spaced rotatable mold assemblies, each with at least two retractable mold sections. The mixture delivery portion is selectively alignable with each mold assembly sequentially in a preselected repeating cycle through an indexing mechanism.

26 Claims, 1 Drawing Sheet

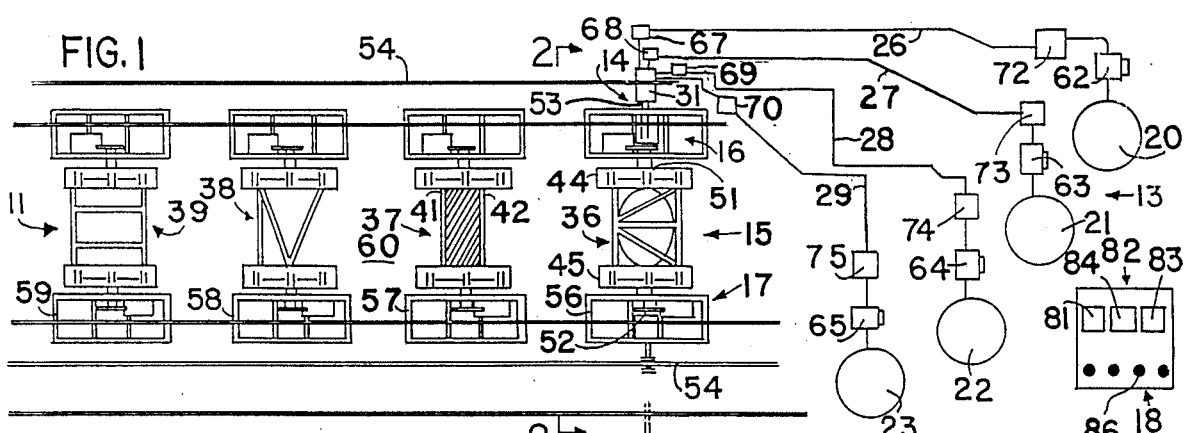
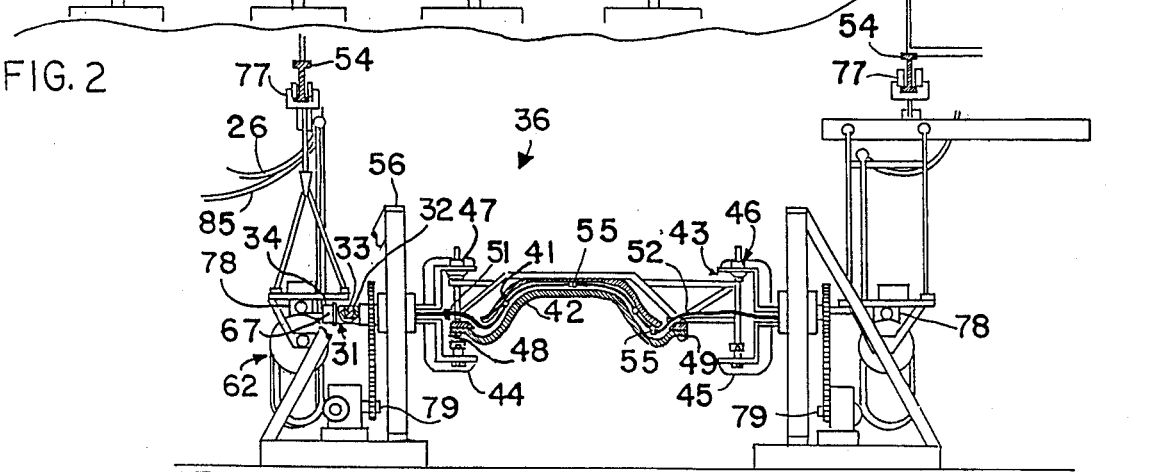
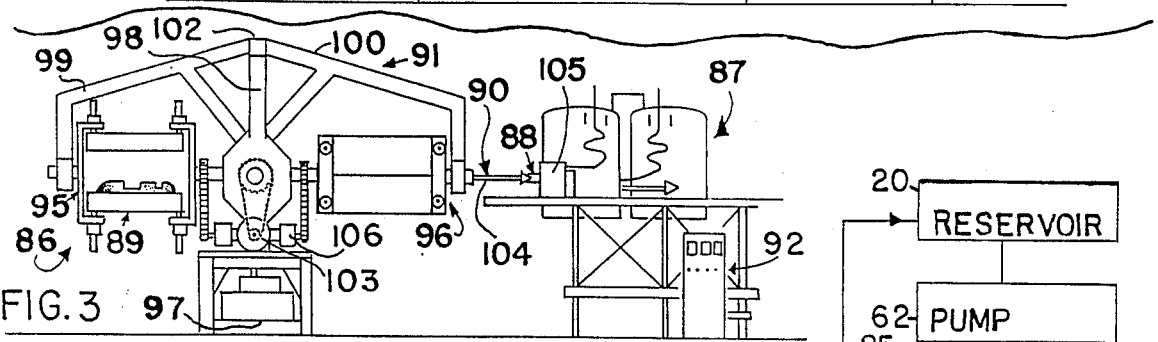
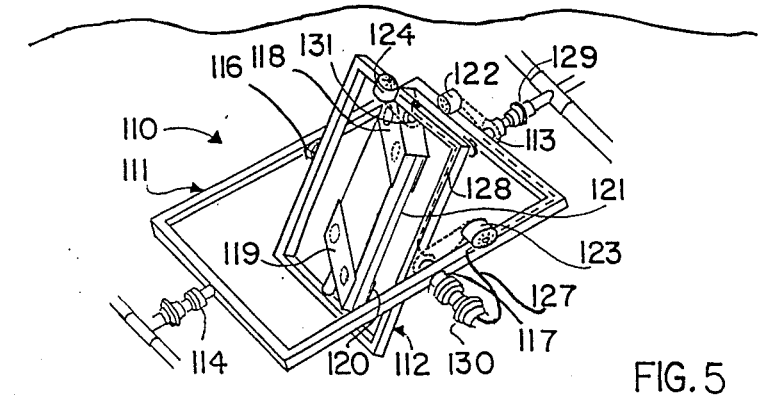
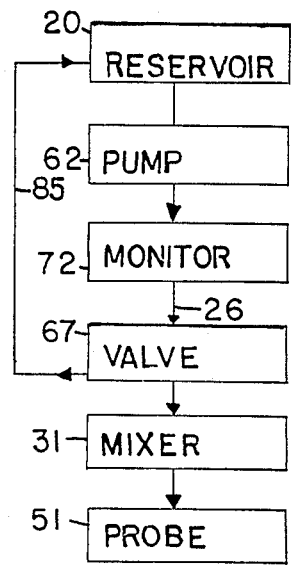

MOLDING APPARATUS AND METHOD

This application is a continuation-in-part of pending application Ser. No. 890,742, filed July 30, 1986, now U.S. Pat. No. 4,749,533 which in turn is a division of application Ser. No. 766,498, filed Aug. 19, 1985, now U.S. Pat. No. 4,671,753.

BACKGROUND OF THE INVENTION

This invention relates to a novel molding apparatus and method and to the novel resulting molded product produced therefrom.

Throughout history, an important activity has been the construction of buildings for various purposes such as dwellings, storage and the like. In primitive societies, it was common to construct such buildings from natural materials that were readily available. In forested areas, structures were erected with logs or boards that had been cut from the logs.

Where trees were less common, people used stone or artificial substitutes formed from mud baked in the sun. To make artificial stones or bricks more durable and less likely to crumble, it was customary to mix straw or similar materials with the mud. These are believed to be the first reinforced products.

As civilizations developed, the use of reinforced products has become much more common. For example, concrete is formed from mixtures of cement and aggregates such as sand, crushed stone, rocks, etc. In addition, for greater strength metal rods, mesh fabric and the like may be incorporated therein. Wood products include plywood and similar laminated units as well as particle board, wafer board and the like.

With the discovery of man-made polymers and resinous materials, the use of fillers and reinforcing materials has become more widespread. These reinforcing materials may be in a variety of forms including particles, fibers, rods, fabrics and the like.

One of the major problems is the proper incorporation of the reinforcing or filler materials into the continuous phase or matrix. Unless a high degree of care is exercised when the reinforcing materials are combined with the principal component, the reinforcement may be distributed non-uniformly and/or voids, bubbles and other weak spots may be created.

Even with reinforcing materials which can be properly placed within a matrix easily, there still is the problem of achieving uniformity of the composition of the matrix. For example, concrete mixes which include cement, water and an aggregate can become non-homogeneous simply by settling on standing. As a result, the trucks which deliver such mixes include drums that are rotated continuously in an attempt to maintain uniformity.

This problem of non-uniformity is important in most batch processes. Although the obvious solution to the shortcomings of batch processes is continuous processing, most products still are produced on a batch or unit basis even though it might be a continuous batch process, that is, individual units or batches are fabricated on an assembly line.

Examples of widespread batch processing are found in the construction industry. Buildings commonly are constructed on the site. Materials such as wood, brick and metal beams are brought to the building site and assembled. A few components such as windows, doors, etc. may be assembled at another site. Although some manufactured housing is pre-fabricated in modules and trucked to the site for assembly, the fabrication work of such components probably still is accomplished on a unit by unit basis. As a result, reproducable high quality remains a serious problem.

The production of man-made plastics and resins is an industry that utilizes a high degree of continuous processing. However, for units of appreciable size, batch processing still is the rule rather than the exception. For example, in the production of fiberglass structures such as boats, it is customary to construct the hulls by hand, building on an open mold in which a plurality of resin and fiberglass layers are sequentially laminated or a plurality of mixed resin/chopped fiber coatings are applied over the mold.

Such hand built products require a large amount of labor and supervision to insure that a reasonable level of quality is achieved. This greatly increases the cost of the product.

The problems of batch processing become more complicated when the resins or polymers are foam-forming. As a multi-component mixture is placed into an open mold, the first part of the mixture begins to foam and grow from the bottom of the mold as a result of an exothermic chemical reaction. The bubble size of the foam is smallest at the bottom where the reaction begins and is largest at the top of the mold as the reaction draws to completion. The resulting product is non-uniform in density from top to bottom and thus has poor structural strength and is unsatisfactory.

In view of the above discussion, it is clear that present manufacturing and fabricating methods and procedures do not provide the efficiencies and design possibilities required currently and in the future. Thus, there is a need for a new fabrication method and apparatus which provide a high degree of quality and uniformity at a relatively low cost.

SUMMARY OF THE INVENTION

The present invention provides a novel continuous molding apparatus and method which not only overcome the deficiencies of present technology but also provide features and advantages not found in earlier expedients. The continuous molding apparatus and method of the invention provide a novel uniform quality product continuously and at low cost.

The continuous molding apparatus of the present invention is simple in design and can be produced relatively inexpensively. Commercially available materials and components can be utilized in the manufacture of the apparatus. Conventional metal fabricating procedures can be employed by semi-skilled labor in the manufacture of the apparatus. The apparatus is durable in construction and has a long useful life with a minimum of maintenance.

BRIEF DESCRIPTION OF THE DRAWINGS

The apparatus and method of the invention can be modified to mold a wide variety of new structures. Variations both in product composition and configuration can be attained simply and quickly with the apparatus and method of the invention. Even with such variations, uniformity and quality of product size and composition is still maintained without difficulty.

These and other benefits and advantages of the novel continuous molding apparatus, method and product of the present invention will be apparent from the following description and the accompanying drawings in which:

FIG. 1 is a view from above of one form of continuous molding apparatus of the invention;

FIG. 2 is an enlarged sectional view of the molding apparatus shown in FIG. 1 taken along line 2—2 thereof;

FIG. 3 is a side view of another form of continuous molding apparatus of the invention;

FIG. 4 is an enlarged view in perspective of a further form of mold assembly of the molding apparatus of the invention; and FIG. 5 is a schematic illustration of one form of control portion of the molding apparatus of the invention.

DESCRIPTION OF THE PREFERRED EMBODIMENTS

As shown in FIGS. 1 and 2 of the drawings, one form of continuous molding apparatus 11 of the present invention includes a raw material supplying portion 13, a mixing portion 14, a molding portion 15, a mixture delivery portion 16, a supporting portion 17 and a control portion 18.

The raw material supplying portion 13 of the molding apparatus 11 of the present invention includes a plurality of reservoirs 20, 21, 22 and 23. These reservoirs may include storage chambers for resins, catalysts, fillers, colors, other additives and the like. The reservoirs 20-23 of the raw material supplying portion 13 are independently connected to the mixing portion 14 through flexible connector means shown as conduits 26, 27, 28 and 29.

The mixing portion 14 of the molding apparatus 11 of the invention includes an elongated chamber 31. A plurality of spaced deflector sections 32 and 33 are disposed along the length of the chamber 31.

The deflector sections 32 and 33 disposed within the chamber 31 advantageously are angled with respect to a longitudinal axis of the chamber, preferably at alternating opposed angles to the axis. The conduits 26-29 advantageously are connected to the mixing chamber through quick connect means 34.

The molding portion 15 of the molding apparatus 11 includes a plurality of spaced mold assemblies 36, 37, 38 and 39. Each of the mold assemblies includes at least two retractable mold sections 41 and 42.

Also, the molding portion includes mold section orienting and interlocking means 43. The means 43 advantageously includes end holding sections 44 and 45 which may be of a generally C-shaped channel configuration. Preferably, the holders 44 and 45 include mechanisms 46 such as pistons 47, and most preferably associated with each end holding member to effect separation of the mold sections and removal of the finished molded product upon completion of the molding cycle.

Advantageously, the mold assemblies are disposed generally parallel to one another with adjacent ends 48 thereof in the same general transverse plane. Likewise, the opposite ends 49 of the mold assemblies may be disposed in a second transverse plane that is generally parallel to the first plane through the mold ends 48.

The mixture delivery portion 16 of the molding apparatus 11 of the invention includes an elongated hollow probe member or members 51 and 52. The probe member or members are selectively connectable with outlet 53 of the mixing chamber 31. Preferably, the mixing portion 14 and the mixture delivery portion are located adjacent to one another. The mixture delivery portion 16 is selectively alignable with each mold assembly sequentially in a preselected repeating cycle.

The mixture delivery portion advantageously is movable along a track 54 generally parallel to the transverse plane through the adjacent ends 48 or 49 of the molding assemblies. Preferably, the track 54 is an overhead track. When more than one probe member is employed, a separate track advantageously is employed with each probe member. Also, the probe members preferably are controlled independently and extend into the mold assembly in an overlapping relationship.

With mold cavities that require the probe to move along a tortuous path as shown in FIG. 2, the probe member advantageously is flexible along at least part of its length. In such situations, it may be preferable to include internal guides 55 through which the probe is threaded while the mold sections are separated.

The supporting portion 17 of the molding apparatus 11 rotatably carries each of the mold assemblies 36-39. As shown in FIGS. 1 and 2, each mold assembly includes a separate frame section 56-59. Thus, mold assembly 36 is rotatably carried on frame section 56, and molds 37, 38, 39 on frames 57, 58, 59 respectively. The frame sections 56-59 commonly are positioned on a common base surface 60 in a parallel spaced arrangement with the mold ends 48 thereof in a single plane and the mold ends 49 thereof in a second parallel plane. The supporting portion also includes translating means 62 guiding the insertion and withdrawal of the probe member or members 51 and 52 from each of the mold assemblies with which they are aligned. Advantageously, the translating means includes an elongated track.

The control portion 18 of the molding apparatus 11 of the invention includes a plurality of pumps, valves, sensors, monitors and the like. Advantageously, a pump 62, 63, 64 or 65, a valve 67, 68, 69 or 70 and a flow monitor 72, 73, 74 or 75 are located along the length of each conduit 26-29 that extends between the raw material reservoirs 20-23 and the mixing chamber 31.

The control portion 18 also includes a plurality of drive means. A first drive 77 provides alignment of the mixture delivery portion 16 with each of the mold assemblies 36-39. As shown in FIGS. 1 and 2, the first drive 77 provides movement of the mixture delivery portion 16 along the overhead track 54 to provide such sequential alignment. A second drive 78 provides movement of probe member 51 for insertion thereof into and withdrawal from each mold assembly. A third drive 79 provides rotation of each mold assembly with respect to its supporting frame section.

The pumps, valves and drives are controlled by actuating means 81 that is responsive to information from flow monitors and sensors. Coordinating means 82 and programmable memory means 83 in combination with the actuating means 81 control the operation of the drives, pumps and valves.

Advantageously, the coordinating means includes a process controller 84 that initiates changes in the flows of materials and speeds of drives to bring variations therein back to the rates specified in the program present in the memory means. This coordination commonly is achieved through the transmission of information as digital pulses from the monitors and/or sensors at the components to the process controller 84. The operating information is compared with the preselected programming parameters stored in the memory. If differences are detected, instructions from the controller change the operation of the components to restore the molding operation to the preselected process specifications.

Novel molded products of the present invention may be formed using the molding apparatus 11 shown in FIGS. 1 and 2 employing the following steps of the molding method of the invention. With the design of the desired molded product established, the control portion 18 including memory 83 which may be a computer, is programmed with the necessary processing parameters for the particular product being molded.

The molding portion 16 is assembled by combining the required mold sections 41 and 42 to provide a mold cavity with the desired configuration. The mold assembly 36 is transferred to frame section 56 and mounted between housing sections 44 and 45 which are rotatably supported on the frame section. The holding sections include mechanisms such as hydraulic pistons 47 which secure the mold sections tightly together and lock the mold assembly to the holding sections during the rotational molding operation.

To start the operation of the apparatus 11, buttons and/or switches 86 of the control portion 18 are depressed to activate the memory 83 and the other components of the control portion. The coordinating means 82 energizes the first drive 77 to move the mixture delivery probe assembly along the track 54 until the probe member is axially aligned with the mold assembly 36. When proper alignment has been achieved, the second drive 78 moves the probe member forward into the mold assembly and the third drive 79 starts the rotation of the mold assembly mounted between the rotatable holder sections.

The pumps 62-65, the valves 67-70 and flow monitors 72-75 also are energized in the preselected sequences of the memory. This causes the raw materials stored in reservoirs 20-23 to advance along conduits 26-29 to the mixing chamber 31. For example, to produce foamed polyurethane resin, reservoir 20 may contain an isocyanate, 21 a polyol, 22 a gas foaming agent and other reservoirs-fillers, colors, catalysts, etc. as required.

To produce high quality molded products of the invention, it is important that the raw materials delivered to the mixing chamber 31 be uniform in composition and volume. This can be facilitated by providing a continuous flow of raw materials to the mixing chamber and the immediate transfer of the mixture to the probe member. However, the delivery of the mixture from the probe member into the mold cavity will vary depending upon the particular incremental area of the cavity being coated at any instant. Also, the delivery should be terminated completely when the probe is outside the mold cavity.

The molding control portion 18 advantageously includes a bypass conduit 85 from the end of each conduit 26-29 adjacent the mixing chamber back to the respective reservoir 20-23. This construction is utilized even though the distance is considerable with the mixing chamber being located closely adjacent the probe member to provide a freshly formed mixture into the cavity. This preferred arrangement is shown schematically in FIG. 5.

The control portion 18 coordinates the operation of the various system components so the required formulation is deposited at the desired areas within the rotating mold cavity as the probe member is being withdrawn. As the probe member is withdrawn at a preselected rate profile, the control portion may change the quantities and/or formulation as required. If the molding portion includes a plurality of interconnected cavities, the quantity of the resin-forming mixture delivered at any particular point during the probe withdrawal can be increased or reduced to provide the desired coating of the mold interior.

As the withdrawing probe 51 reaches the end of the mold cavity, a final shot of the liquid mixture advantageously is blown into the cavity with a pulse of an inert gas. This clears the mixing chamber 31 and the probe member of excess chemicals. The probe then is separated completely from the mold portion. A solvent followed by a burst of air preferably are blown through the mixing chamber to remove any final traces of the mixture before it can react to form a resin and clog the passages.

Without waiting for the reaction to be completed, the separated probe 51 is moved along track 54 to the next mold assembly 37 and the steps described above with respect to mold assembly 36 repeated. The molding cycle is continued by moving the probe sequentially to the other mold assemblies 38 and 39 and then returning the probe and the mixture delivery portion back along track 54 to mold assembly 36.

The operation of the second probe member 52 is coordinated with that of probe 51. Also, if desired, a second row of mold assemblies can be installed next to the first row and serviced with a rotatable probe 52 and a third probe (not shown) on the far side of the second row. Probe 52 can be rotated 180° to align it with each mold assembly of the second row.

The components of the liquid mixture deposited on the mold interior quickly begin to react to form the thermosetting resin structure. The mixture initially spread over the mold interior forms a resin coating with a high density primarily due to the greater centrifugal force at the periphery which suppresses or delays bubble formation. As the reaction rate increases due to the exothermic reaction of the resin formation, the foam formed decreases in density.

The foam density decreases substantially uniformly as the spacing from the mold cavity surfaces increases. At the same time, the air within the mold cavity displaced by the foam exhausts out the spacing around the probe inlet. This decrease in density continues until the foams that are expanding toward each other meet. At these boundaries, a thin high density central barrier is formed.

Prior to the return of probe 51 to each mold assembly to repeat the cycle, the rotation of the mold assembly is stopped and pistons 47 are actuated to separate the mold sections 41 and 42 and free the molded product therefrom. The separated molded product is set aside to complete the foam formation and/or the curing of the resin therein. During this period, the final expansion of the foam, free of the mold's restraint, stresses the high density outer skin or layer of the product. This stressing of the skin increases the strength and puncture resistance thereof and also the structural strength of the molded product itself. The structural strength of the product can be enhanced further by including a particle or fiber filler in the mixture prior to molding.

Another form of continuous molding apparatus 86 of the present invention is shown in FIG. 3. Molding apparatus 86 includes a raw material supplying portion 87, a mixing portion 88, a molding portion 89, a mixture delivery portion 90, a supporting portion 91 and a control portion 92. The raw material supplying portion 87, the mixing portion 88, the mixture delivery portion 90 and the control portion 92 may be similar to the corresponding portions 13, 14, 16 and 18 of molding apparatus 11 as described above.

Molding portion 89 of apparatus 86 includes a plurality of mold assemblies 95 and 96 arranged radially about a central axis 97. Supporting portion 91 includes a rotatable central tower 98 with a plurality of equally spaced arms shown as arms 99, 100 extending radially from the upper end 102 of the tower. A mold assembly 95, 96 is rotatably supported on each arm.

Mixture delivery portion 90 is aligned radially outside one mold assembly so that when tower 98 is rotated by a first drive 103 during the molding cycle, each mold assembly is sequentially moved into alignment with the mixture delivery portion. Additional processing can be effected at the other stations while the resin mixture is introduced into a succeeding mold assembly provided the mold is opened to release the finished molded product prior to a particular mold assembly being rotated back into alignment with the mixture delivery portion for the molding cycle to be repeated.

Molded products of the present invention may be formed using the molding apparatus 86 shown in FIG. 3 employing the molding method of the invention. The raw materials from portion 87 are transferred to mixing portion 88 with control portion 92 in the same way as described above for apparatus 11. The molding assemblies 95 and 96 of the molding portion 89 are rotatably suspended from arms 99 and 100 that extend radially from the rotatable central tower 98. The mold assemblies are sequentially aligned with probe member 104 of the mixture delivery portion 90.

A freshly prepared mixture from the mixing portion 88 passes through the probe member which has been inserted in a mold cavity by second drive 105 which then withdraws the probe slowly as the mixture is being delivered therefrom against the walls of the mold cavity of the mold assembly as it is being rotated by third drive 106.

When the probe has been withdrawn completely from the mold assembly 95, the tower 98 rotates the mold away from the mixture delivery portion and moves mold assembly 96 into alignment with the probe member for insertion into the mold cavity thereof and delivery of the mixture thereto as described above for mold assembly 95. Prior to the realignment of mold assembly 95 with the probe again, the mold sections thereof are separated and the molded product therein removed and handled as above. The resulting molded products are high in quality as the products formed with apparatus 11 above.

FIG. 4 illustrates a mold assembly 110 to be utilized with the molding apparatus 11 and 86 described above. The mold assembly is capable of being rotated about three axes, each generally perpendicular to the others. The assembly includes first and second peripheral frame sections 111 and 112. Frame section 111 is rotatable about midpoints 113 and 114 disposed at opposite ends of the frame. Similarly, inner frame section 112 is rotatable about midpoints 116 and 117 along the sides of the outer frame section 111. Inner frame section 112 includes rotatable mold holding members 118 and 119 that extend inwardly from opposite ends thereof. A mold assembly 121 is mounted between channels 120 of the holding members. Outer frame section 111 is rotated by drive 122 about one axis, inner frame section 112 is rotated by drive 123 about a second axis and the mold assembly 121 is rotated by drive 124 about a third axis.

The mold assembly 110 is mounted for rotation within a support portion (not shown) that is similar to the supporting portions 17 and 91 of molding apparatus 11 and 86 respectively. The three drives are operatively connected to a suitable control portion. Also, the raw material supply lines are connected to conduits or passages 127 and 128 along parts of the frame sections 111 and 112 through rotatable couplings 129, 130, 131.

The mold assembly 110 is used to form molded products of the invention employing the molding method of the invention in the same way as described above. The mold assembly is especially useful in the molding of products with complex shapes. The mold assembly facilitates the distribution of the resin-forming mixture into sections thereof which extend along tortuous paths. One or more of the drives can be operated at the same time as required to achieve the desired distribution of the mixture throughout the mold cavity.

The above description and the accompanying drawings show that the present invention provides a novel product, molding method and molding apparatus which not only overcome the deficiencies and shortcomings of earlier expedients, but also provide novel features and advantages not found in previous products, methods and apparatus. The molding method and apparatus of the invention produce continuously a novel product with close tolerances of composition, strength and appearance at a significantly lower cost than competitive products.

The continuous molding apparatus of the invention is simple in design and relatively inexpensive. Commercially available materials and components can be utilized in the fabrication of the molding apparatus using conventional metal working techniques and procedures.

Products can be produced efficiently with the apparatus and method by operators with limited experience and aptitude after a short period of instruction. The apparatus is durable in construction and has a long useful life with a minimum of maintenance.

The apparatus and method of the invention can be utilized to mold a wide variety of different products. Variations in composition, structure and surface appearance of the products can be achieved simply and quickly with the method and apparatus of the invention.

It will be apparent that various modifications can be made in the particular continuous molding apparatus and method and the products produced thereby as described in detail above and shown in the drawings within the scope of the present invention. The size, configuration and arrangement of components and materials can be changed to meet specific requirements. For example, the number of components and reservoirs may be different. Also, the apparatus may include other drive and actuating components and mechanisms. These and other changes can be made in the continuous molding apparatus, method and products provided the functioning and operation thereof are not adversely affected. Therefore, the scope of the present invention is to be limited only by the following claims.

What is claimed is:

1. Continuous molding apparatus including a raw material supplying portion, a mixing portion, a molding portion, a mixture delivery portion, a supporting portion and a control portion; said raw material supplying portion including a plurality of reservoirs; said mixing portion including an elongated chamber, a plurality of spaced deflector sections disposed along the length of said elongated chamber, reservoirs of said raw material supplying portion being independently connected to inlets of said mixing portion through flexible connector means; said molding portion including a plurality of spaced enclosed mold assemblies, each of said mold assemblies including at least two retractable mold sections, and mold section orienting and interlocking means; said mixture delivery portion including a hollow probe member selectively connectable with an outlet of said mixing portion; said mixture delivery portion being selectively alignable with each enclosed mold assembly sequentially in a preselected repeating cycle; said supporting portion including indexing means providing said selective and repeating alignment between said mixture delivery portion and each of said mold assemblies, said supporting portion including support sections rotatably carrying each of said mold assemblies; said control portion including drive means moving said indexing means, said mold section orienting and interlocking means and the rotation of said mold assemblies in a preselected rotational profile, valve means and flow monitoring means disposed along the length of each of said connector means, programmable memory means controlling said drive means and valve means, and actuating means responsive to said memory means activating said drive means and said valve means.

2. Continuous molding apparatus according to claim 1 wherein said raw material supplying portion is connected to said mixing portion through said rotatable support section.

3. Continuous molding apparatus according to claim 1 wherein said raw material supplying portion includes separate bypass return flexible connector means from the end of each of said supplying flexible connector means adjacent said mixing portion back to the respective reservoir.

4. Continuous molding apparatus according to claim 1 wherein said elongated chamber of said mixing portion is located adjacent to said probe member of said mixture delivery portion.

5. Continuous molding apparatus according to claim 1 wherein said mold assemblies are disposed radially about a central axis.

6. Continuous molding apparatus according to claim 1 wherein said mold assemblies are disposed generally parallel to one another with adjacent ends thereof in common planes.

7. Continuous molding apparatus according to claim 5 wherein said mixture delivery portion is aligned radially adjacent ends of said molding assemblies remote from said central axis.

8. Continuous molding apparatus according to claim 6 wherein said mixture delivery portion is movable along guide means generally parallel to common planes through adjacent ends of said mold assemblies.

9. Continuous molding apparatus according to claim 8 wherein said guide means includes an overhead track.

10. Continuous molding apparatus according to claim 1 wherein said mixture delivery portion includes more than one probe member.

11. Continuous molding apparatus according to claim 1 wherein said probe member is flexible along at least part of its length.

12. Continuous molding apparatus according to claim 10 wherein said probe members extend into said mold assemblies in an overlapping relationship.

13. Continuous molding apparatus according to claim 10 wherein said probe members are controlled independently.

14. Continuous molding apparatus according to claim 1 wherein said mixture delivery portion includes translating means including elongated guiding means.

15. Continuous molding apparatus according to claim 1 wherein said mold portion includes internal probe member guiding means.

16. Continuous molding apparatus according to claim 1 wherein said mold section interlocking means includes pressurized fluid activating means.

17. Continuous molding apparatus according to claim 1 wherein said drive means of said control portion includes electric motors.

18. Continuous molding apparatus according to claim 1 wherein said supporting portion provides rotational capability along more than one axis.

19. Continuous molding apparatus according to claim 18 wherein said rotational axes are generally perpendicular to one another.

20. Continuous molding apparatus according to claim 1 wherein said control portion includes coordinating means for said memory means and said drive means, said valve means and said flow monitoring means.

21. A continuous molding method including the steps of positioning a plurality of separable section enclosed mold assemblies in a preselected arrangement with spacing therebetween, axially aligning sequentially a mixture delivery assembly with each of said mold assemblies, during each alignment performing the steps of continuously rotating said aligned mold assembly in a preselected rotational profile, dispensing a freshly prepared foamable resin-forming liquid mixture through a probe member disposed in an enclosed cavity of said aligned mold assembly, withdrawing said probe member in a preselected rate profile while continuously dispensing said resinforming mixture therefrom in a preselected flow rate profile, spreading said mixture within said cavity by centrifugal force, continuing said rotation of said mold assembly while said mixture forms a foam therein completely filling said mold cavity, displacing air in said cavity with said foam and exhausting said air along the outside of said probe member, monitoring the delivery of said liquid mixture into said mold cavity and coordinating same with the flow of raw materials, the mold assembly rotation and the withdrawal of said probe member, separating said mold sections of each mold assembly after said probe member is withdrawn completely therefrom, removing a molded foamed resin product from said separated mold sections, closing said mold sections, inserting said probe member therein and repeating said cycle to form a multiplicity of such molded products on a continuing basis.

22. A continuous molding method according to claim 21 wherein said mold assemblies are positioned parallel to one another with their ends in common planes.

23. A continuous molding method according to claim 21 wherein said mold assemblies are positioned radially about a central axis.

24. A continuous molding method according to claim 22 wherein said mixture delivery assembly moves from one mold assembly to the next in a repeating cycle.

25. A continuous molding method according to claim 23 wherein said mold assemblies are interconnected and each mold assembly is moved sequentially into alignment with said mixture delivery assembly.

26. A continuous molding method according to claim 21 wherein said steps are coordinated and controlled automatically.

* * * * *